(12) United States Patent
Foster et al.

(10) Patent No.: US 11,669,804 B2
(45) Date of Patent: Jun. 6, 2023

(54) EQUIPMENT LIBRARY WITH LINK TO MANUFACTURER DATABASE

(71) Applicants: CNH Industrial America LLC, New Holland, PA (US); Autonomous Solutions, Inc., Mendon, UT (US)

(72) Inventors: Christopher Alan Foster, Mohnton, PA (US); John Henry Posselius, Ephrata, PA (US); Bret Todd Turpin, Wellsville, UT (US); Daniel John Morwood, Petersboro, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 19 days.

(21) Appl. No.: 17/142,740

(22) Filed: Jan. 6, 2021

(65) Prior Publication Data

US 2021/0255603 A1    Aug. 19, 2021

Related U.S. Application Data

(63) Continuation of application No. 15/145,361, filed on May 3, 2016, now abandoned.

(51) Int. Cl.
*G06Q 10/08* (2023.01)
*G05B 19/4155* (2006.01)
(Continued)

(52) U.S. Cl.
CPC ..... *G06Q 10/0875* (2013.01); *G05B 19/4155* (2013.01); *G06F 3/0482* (2013.01);
(Continued)

(58) Field of Classification Search
CPC combination set(s) only.
See application file for complete search history.

(56) References Cited

U.S. PATENT DOCUMENTS

| 5,142,128 A | 8/1992 | Perkin et al. |
| 5,446,575 A | 8/1995 | Lysakowski et al. |

(Continued)

FOREIGN PATENT DOCUMENTS

| DE | 19959755 A1 | 6/2001 |
| EP | 2413293 A1 | 2/2012 |
| WO | 2015/042540 A1 | 3/2015 |

OTHER PUBLICATIONS

Lenz et al.; "Customized Software in Distributed Embedded Systems: ISOBUS and the Coming Revolution in Agriculture;" Agricultural Engineering International: the CIGR Ejournal; Jul. 31, 2007.

(Continued)

*Primary Examiner* — Peter Ludwig
*Assistant Examiner* — Reva R Moore
(74) *Attorney, Agent, or Firm* — Rebecca Henkel; Rickard DeMille

(57) ABSTRACT

In one embodiment a method includes storing in non-volatile memory a library of equipment configuration code files, each equipment configuration code file including configuration code for configuration and control of a work vehicle, for configuration and control of an attachment to be carried or towed by the work vehicle, or for combined configuration and control of both the work vehicle and the attachment in combination, receiving an altered version of at least one equipment configuration code file, the altered version including OEM data provided by or altered by an original equipment manufacturer of the work vehicle or the attachment, dealer or distributor data provided by or altered by a dealer or distributor of the work vehicle or the attachment, and user data provided by or altered by a user of the work vehicle or attachment, and storing the altered version in the non-volatile memory of the library.

20 Claims, 9 Drawing Sheets

(51) Int. Cl.
*G06Q 10/0875* (2023.01)
*G06F 16/22* (2019.01)
*G06F 16/21* (2019.01)
*G06Q 10/00* (2023.01)
*G06F 3/0482* (2013.01)
*G06F 3/04847* (2022.01)

(52) U.S. Cl.
CPC ........ *G06F 3/04847* (2013.01); *G06F 16/219* (2019.01); *G06F 16/22* (2019.01); *G06Q 10/00* (2013.01); *G05B 2219/45017* (2013.01)

(56) References Cited

U.S. PATENT DOCUMENTS

| | | |
|---|---|---|
| 5,513,171 A | 4/1996 | Ludwiczak et al. |
| 5,604,892 A | 2/1997 | Nuttall et al. |
| 5,634,016 A | 5/1997 | Steadham, Jr. et al. |
| 5,684,476 A | 11/1997 | Anderson |
| 5,712,782 A | 1/1998 | Weigelt et al. |
| 5,786,998 A | 7/1998 | Neeson et al. |
| 5,802,144 A | 9/1998 | Laird et al. |
| 5,815,071 A | 9/1998 | Doyle |
| 5,844,987 A | 12/1998 | Matthews et al. |
| 5,913,180 A | 6/1999 | Ryan |
| 5,930,779 A | 7/1999 | Knoblock et al. |
| 5,938,716 A | 8/1999 | Shutty et al. |
| 5,991,759 A | 11/1999 | Knoblock et al. |
| 6,023,699 A | 2/2000 | Knoblock et al. |
| 6,061,617 A * | 5/2000 | Berger .................. E02F 3/438 |
| | | 701/34.2 |
| 6,128,574 A | 10/2000 | Diekhans |
| 6,131,060 A | 10/2000 | Obradovich et al. |
| 6,141,614 A | 10/2000 | Janzen et al. |
| 6,640,145 B2 | 10/2003 | Hoffberg et al. |
| 6,757,521 B1 | 6/2004 | Ying |
| 6,832,206 B1 | 12/2004 | Chelnik |
| 6,845,307 B2 | 1/2005 | Rother |
| 6,892,131 B2 | 5/2005 | Coffee et al. |
| 7,489,981 B2 | 2/2009 | Kiuchi et al. |
| 7,596,636 B2 | 9/2009 | Gormley |
| 7,747,710 B1 | 6/2010 | Osburn, III et al. |
| 7,953,526 B2 | 5/2011 | Durkos et al. |
| 8,010,571 B2 | 8/2011 | Knoblock et al. |
| 8,117,461 B2 | 2/2012 | Bigelow, Jr. et al. |
| 8,200,428 B2 | 6/2012 | Anderson |
| 8,437,901 B2 | 5/2013 | Anderson |
| 9,104,537 B1 | 8/2015 | Penilla et al. |
| 9,135,758 B2 | 9/2015 | Giraud |
| 9,177,429 B2 | 11/2015 | Lawrenson |
| 2004/0167689 A1 | 8/2004 | Bromley et al. |
| 2005/0065678 A1 | 3/2005 | Smith et al. |
| 2005/0165521 A1 | 7/2005 | Gruhn |
| 2007/0112700 A1 | 5/2007 | Den Haan et al. |
| 2008/0052216 A1 | 2/2008 | Johnson et al. |
| 2009/0300595 A1 | 12/2009 | Moran et al. |
| 2010/0217462 A1 | 8/2010 | Shaffer et al. |
| 2011/0080278 A1 | 4/2011 | Crombez et al. |
| 2011/0257850 A1 | 10/2011 | Reeve et al. |
| 2014/0077972 A1 | 3/2014 | Rathi et al. |
| 2014/0309892 A1 | 10/2014 | Ricci |
| 2015/0286219 A1 | 10/2015 | Reichel et al. |
| 2015/0319913 A1 | 11/2015 | Foster et al. |
| 2016/0041559 A1 | 2/2016 | Wellman et al. |
| 2016/0116906 A1 * | 4/2016 | Grivetti ............ G05B 19/40938 |
| | | 700/180 |
| 2016/0183447 A1 * | 6/2016 | Buhler .................. G06Q 50/02 |
| | | 701/50 |
| 2018/0277067 A1 * | 9/2018 | Tentinger ................ G06F 3/012 |

OTHER PUBLICATIONS

Method CRM Help Center; Method Integration; Feb. 13, 2014; https://www.methodintegration.com/method/kb.aspx?folder=methodcrm&article=Equipment&id=382.

VSystem Drive Operation; Precision Planting; Jan. 31, 2014.

* cited by examiner

FIG. 9

EQUIPMENT LIBRARY WITH LINK TO MANUFACTURER DATABASE

CROSS REFERENCE TO RELATED APPLICATIONS

This application is a continuation of U.S. patent application Ser. No. 15/145,361, filed May 3, 2016, which is incorporated herein by reference.

BACKGROUND

The disclosure relates generally to agricultural equipment, and specifically to inputting equipment settings into an agricultural equipment command and control system.

An operator may use agricultural equipment (e.g., tractors, harvesters, seeders, tillers, etc.) to perform tasks at an agricultural application. In some instances, multiple pieces of equipment (e.g., a tractor and a tiller) may be used together to perform a task. In some cases, an operator may use one piece of equipment (e.g., the tractor) by itself, or in conjunction with other pieces of agricultural equipment, to perform multiple tasks in a short period of time (e.g., a few hours, one day, a few days, a week, etc.). Similarly, in some instances multiple pieces of equipment may be used simultaneously at an agricultural application (e.g., a field) to perform the same or different agricultural tasks. These functions may be orchestrated via a command and control system. Typically, when the operator transitions from one task to another, or from one combination of equipment to another, the operator adjusts the settings of the agricultural equipment for the next task to be performed. Though adjusting the settings of a piece of agricultural equipment has traditionally been done manually, many of the adjustments are now made via the command and control system software. As agricultural equipment, and the corresponding command and control system become more complex and sophisticated, setting up one or more pieces of equipment to perform tasks may become a more involved process for the operator, resulting in lost time and reduced efficiency.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment a method includes storing in non-volatile memory a library of equipment configuration code files, each equipment configuration code file including configuration code for configuration and control of a work vehicle, for configuration and control of an attachment to be carried or towed by the work vehicle, or for combined configuration and control of both the work vehicle and the attachment in combination, receiving an altered version of at least one equipment configuration code file, the altered version including OEM data provided by or altered by an original equipment manufacturer of the work vehicle or the attachment, dealer or distributor data provided by or altered by a dealer or distributor of the work vehicle or the attachment, and user data provided by or altered by a user of the work vehicle or attachment, and storing the altered version in the non-volatile memory of the library.

In another embodiment a system includes a non-volatile memory storing a library of equipment configuration code files, each equipment configuration code file including configuration code for configuration and control of a work vehicle, for configuration and control of an attachment to be carried or towed by the work vehicle, or for combined configuration and control of both the work vehicle and the attachment in combination, the library further storing an altered version of at least one equipment configuration code file, the altered version comprising OEM data provided by or altered by an original equipment manufacturer of the work vehicle or the attachment, dealer or distributor data provided by or altered by a dealer or distributor of the work vehicle or the attachment, and user data provided by or altered by a user of the work vehicle or attachment, and means for transmitting at least one of the equipment configuration code files and the altered version to at least one of the original equipment manufacturer, the dealer or distributor, and the user for storage on and use by the work vehicle or the attachment or both for configuration and control of the work vehicle or the attachment or both.

In a further embodiment a non-volatile machine-readable medium storing electronic data includes a library of equipment configuration code files, each equipment configuration code file including configuration code for configuration and control of a work vehicle, for configuration and control of an attachment to be carried or towed by the work vehicle, or for combined configuration and control of both the work vehicle and the attachment in combination, the library further storing an altered version of at least one equipment configuration code file, the altered version including OEM data provided by or altered by an original equipment manufacturer of the work vehicle or the attachment, dealer or distributor data provided by or altered by a dealer or distributor of the work vehicle or the attachment, and user data provided by or altered by a user of the work vehicle or attachment.

DRAWINGS

These and other features, aspects, and advantages of the present invention will become better understood when the following detailed description is read with reference to the accompanying drawings in which like characters represent like parts throughout the drawings, wherein:

FIG. 9 is a screenshot from one embodiment of the command and control software showing information (which may be part of the equipment configuration code file) for a towed implement in accordance with an embodiment.

DETAILED DESCRIPTION

Figure 1:
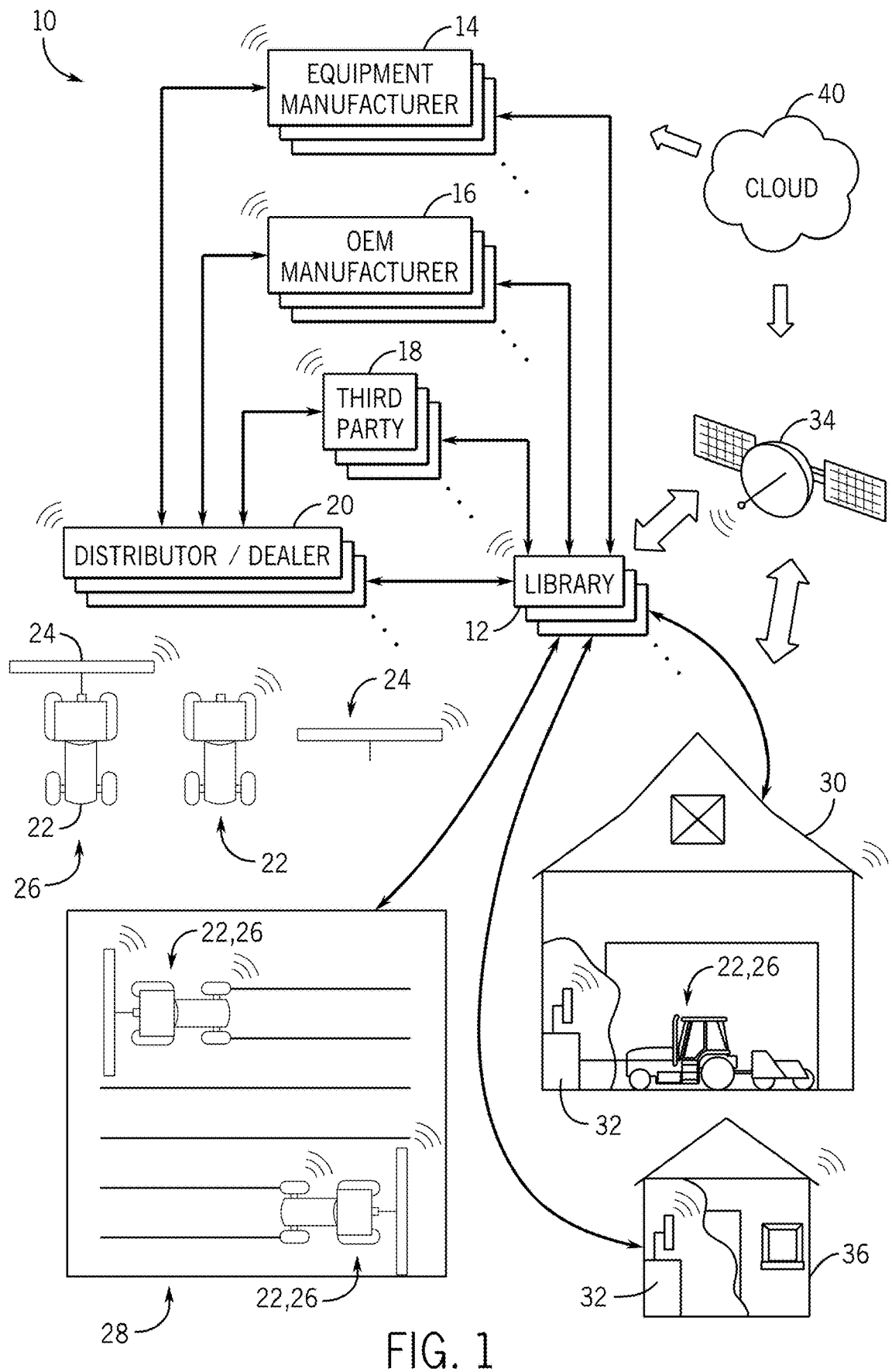
FIG. 1 is a schematic of one embodiment of an ecosystem for populating and maintaining one or more libraries of agricultural equipment configuration code files.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various pieces of agricultural equipment (e.g., tractors, harvesters, seeders, tillers, etc.) may be used individually, or in conjunction with one another (e.g., work vehicle and implement, or multiple work vehicles, each with or without an implement), to perform various agricultural tasks (tilling, planting, spraying, harvesting, etc.) at an agricultural application (e.g., a farm). In some embodiments, multiple vehicles, with or without implements, may perform the same or different agricultural tasks on a field. The various agricultural tasks may be coordinated by a command and control system in communication with the vehicles via a communication network (e.g., wireless radio, satellite communication, etc.) The command and control system may be used for planning vehicle paths, assigning segments of vehicle paths, setting action point locations (e.g., where to raise or lower implement), define the minimum turning radius for various equipment combinations, etc. For example, the command and control system may be used to coordinate multiple tractors performing the same or different agricultural tasks, with the same or different width implements, in the same field. Between the completion of one task and the beginning of the next task, the operator may set up one or more pieces of equipment for the new task. This may be done via command and control system software. Set up may include adjusting settings, removing or installing an attachment, coupling or decoupling two or more pieces of equipment, etc. As agricultural equipment, and corresponding command and control systems become more complex and sophisticated, many of the equipment settings are adjusted electronically through software. More sophisticated and capable equipment may have more complex setup procedures. Transition time between tasks, during which the operator prepares one or more pieces equipment to perform the next task, may result in significant amounts of lost time and reduced efficiency. By utilizing a library of equipment configuration code files that contain pre-loaded (e.g., by the manufacturer, the dealer, the user, or a third party) settings and information for pieces of equipment, or combinations of pieces of equipment, the operator may reduce transition time between tasks and improve the consistency of equipment set up. Reduced transition time between tasks and consistent equipment set up may increase the efficiency of an agricultural application.

FIG. 1 is a schematic of an ecosystem 10 for populating and maintaining one or more libraries 12 of agricultural equipment configuration code files (e.g., files of setup code configured for control of one or more pieces of equipment). One or more equipment manufacturers 14 may create equipment configuration code files (e.g., a group of information and settings) based on relevant data for each piece of equipment stored in their databases. The equipment manufacturers 14 may add equipment configuration code files to the library 12 (e.g., stored in non-volatile memory) for pieces of equipment that they manufacture. These equipment configuration code files may be default configuration code files, containing the dimensions (e.g., length, width, height, etc.) of the piece of equipment, characteristics of the piece of equipment (e.g., minimum turning radius, fuel efficiency, compatibility with other pieces of equipment), operating constraints (e.g., maximum speed, etc.), default settings, and other pieces of information about the equipment. In some embodiments, one or more original equipment manufacturers (OEMs) 16 may also maintain, have access to, and/or contribute equipment configuration code files to the library 12 based on information in their databases. For example, an OEM 16 that manufactures a part for a harvester may update an existing configuration code files for the harvester, or generate a new configuration code file for the harvester in the library 12 based on the part that the OEM 16 manufactures. One or more third parties 18 may also contribute to the library 12 by updating existing configuration code files or creating new configuration code files. The third party 18 may be an aftermarket part manufacturer, a provider of software, a service provider, an organization, or any entity other than the equipment manufacturer 14 or an OEM 16.

A dealer/distributor 20 may also maintain or otherwise have access to the library 12. The dealer may have an inventory of agricultural vehicles 22 (e.g., tractors), pieces of add-on equipment 24 (e.g., implements that may be towed by or carried by the vehicle) to be used with one or more agricultural vehicles 22, or agricultural systems 26 that include vehicles 22 and implements 24. In some embodiments, the vehicle 22 may be a tractor or a support vehicle that does not include an implement. In such cases, the vehicle 22 may be configured to attach to a piece of add-on equipment 24 to perform an agricultural task. In other embodiments, the vehicle 22 may include an implement or attachment for performing an agricultural task (e.g., a combine). The dealer 20 may also be capable of combining vehicles 22 and add-on attachments 24 to provide various agricultural system combinations 26 of equipment (e.g., tractor and implement) for the purchaser. In some embodiments, the combination may include a vehicle 22 and multiple pieces of add-on equipment 24. For example, the combination may include a tractor 22, a seeder, and an air cart. In some embodiments, the purchaser may purchase one vehicle (e.g., tractor 22) and multiple pieces of add-on equipment (e.g., seeders, tillers, harvesters, etc.) that may be coupled with the tractor 22 in various combinations 26 to perform various agricultural tasks. The dealer 20 may assist the purchaser or equipment owner in customizing equipment configuration code files by altering them to reflect various equipment combinations 26, various options purchased, the specific uses the equipment owner plans, maintenance/service history, etc. The distributor/dealer 20 may add or alter equipment configuration code files directly from the library 12. The distributor/dealer 20 may also receive configuration code files or configuration code file templates from the manufacturers 14, the OEMs 16, or the third parties 18 to customize or alter. The distributor/dealer 20 may assist the purchaser in configuring purchased equipment with previously purchased equipment (or existing equipment owned by the purchaser) or later-purchased equipment, for a term which may last weeks, months, years, the length of the purchaser's ownership, the life of the equipment, or some other amount of time. In further embodiments, the purchaser may create and alter configuration code files on his or her own without assistance from the distributor/dealer 20 and store them for later access for control of one or more pieces of equipment.

Upon purchasing one or more pieces of equipment 22, 26, the purchaser (e.g., a farmer or operator) may take the one or more pieces of equipment 22, 26 to a work location (e.g., a farm), or have the one or more pieces of equipment 22, 26 delivered to the work location. The operator may then use the configuration code files via command and control system software to set up and control the one or more pieces of equipment 22, 26 during performance of an agricultural task on a field 28. As shown in FIG. 1, the command and control system may be used to coordinate multiple agricultural tasks performed by multiple tractor 22/implement 24 combinations on the same field 28. Agricultural tasks may include tilling, seeding, planting, fertilizing, spraying, harvesting, and the like. Before, after, or in between agricultural tasks, the one or more pieces of equipment 22, 26 may be taken to a barn 30 or garage. The barn 30 may be used to store one or more pieces of equipment 22, 26 (e.g., between tasks, overnight, or in the days, weeks, or months between uses). The barn may also be used to reconfigure or adjust the settings of one or more pieces of equipment 22, 26 via the command and control system software. Once an equipment configuration code file has been set up, verified (e.g., an agricultural task successfully performed at an actual work location), and saved to the library 12, the equipment may quickly be set up to perform the task again by loading the stored equipment configuration code file from the user's library. For example, a tractor 22 coupled to one implement 24 may be brought into the barn to remove the first implement 24 and install a second implement 24 for performing a new task. The tractor 22 would check into the command and control system, remove the first implement, uninstall the first equipment configuration code file, attach the second implement, and load the equipment configuration code file for the second implement. The equipment configuration code file may include a mission plan or mission data for the next task, or the mission data may be added separately. In another embodiment, the one or more pieces of equipment 22, 26 may be brought into the barn 30 to adjust settings in the configuration code file before returning to the field 28 to continue an agricultural task. In some embodiments, the barn may include a docking station 32. The docking station may connect to the one or more pieces of equipment 22, 26 via a wired or wireless connection. The docking station 32 may then use a wired or wireless network connection at the barn 30, or a cellular network in order to access the library 12 and exchange (e.g., upload or download) configuration code files. This may be done using the command and control software, or a different software package. The docking station 32 may also enable the user to manage the configuration code files of the one or more pieces of equipment 22, 26. In other embodiments, the one or more pieces of equipment 22, 26, and the command and control system, may be capable of directly accessing the library 12 wirelessly via a cellular network, satellites 34, or some other method. In such an embodiment, equipment configuration code files may be downloaded, altered, and stored (e.g., uploaded) without plugging into a docking station 32 (e.g., out in the field 28). As will be discussed in more detail below, accessing the library 12 may be done via a user interface on the docking station 32, on the piece of equipment 22, 24, via a mobile device, tablet, notebook computer, or some other way.

The operator may also be able to access the library 12 from his or her home 36. As with access from the barn 30, access to the library 12 may be via a wired or wireless network connection at the home 36, or a cellular network. The operator may access the library using a work station 38, which may include a computing device. In other embodiments, the operator may access the library via a mobile device, tablet, notebook computer, or some other device.

In some embodiments, the library 12 may be stored in, or otherwise accessed via the cloud 40. Operators, dealer/distributors 20, equipment manufacturers 14, OEMs 16, third parties 18, and other entities may access, download, modify, and upload one or more equipment configuration code files via the cloud 40. In some embodiments, when a manufacturer 14, 16, 18 creates a new equipment configuration code file for a piece of equipment, updates the equipment configuration code file, or otherwise updates the information in their database, the new information or equipment configuration code file may be pushed to the library 12, or directly to the piece of equipment. In some embodiments, the equipment configuration code file in the user's library 12, or the equipment settings for a given piece of equipment, may be updated automatically. In other embodiments, a notification may be generated and pushed to the piece of equipment and/or the operator indicating that an updated equipment information or configuration code file is available. The operator or equipment owner may then make the decision whether or not to update the equipment settings or the equipment configuration code file.

Figure 2:
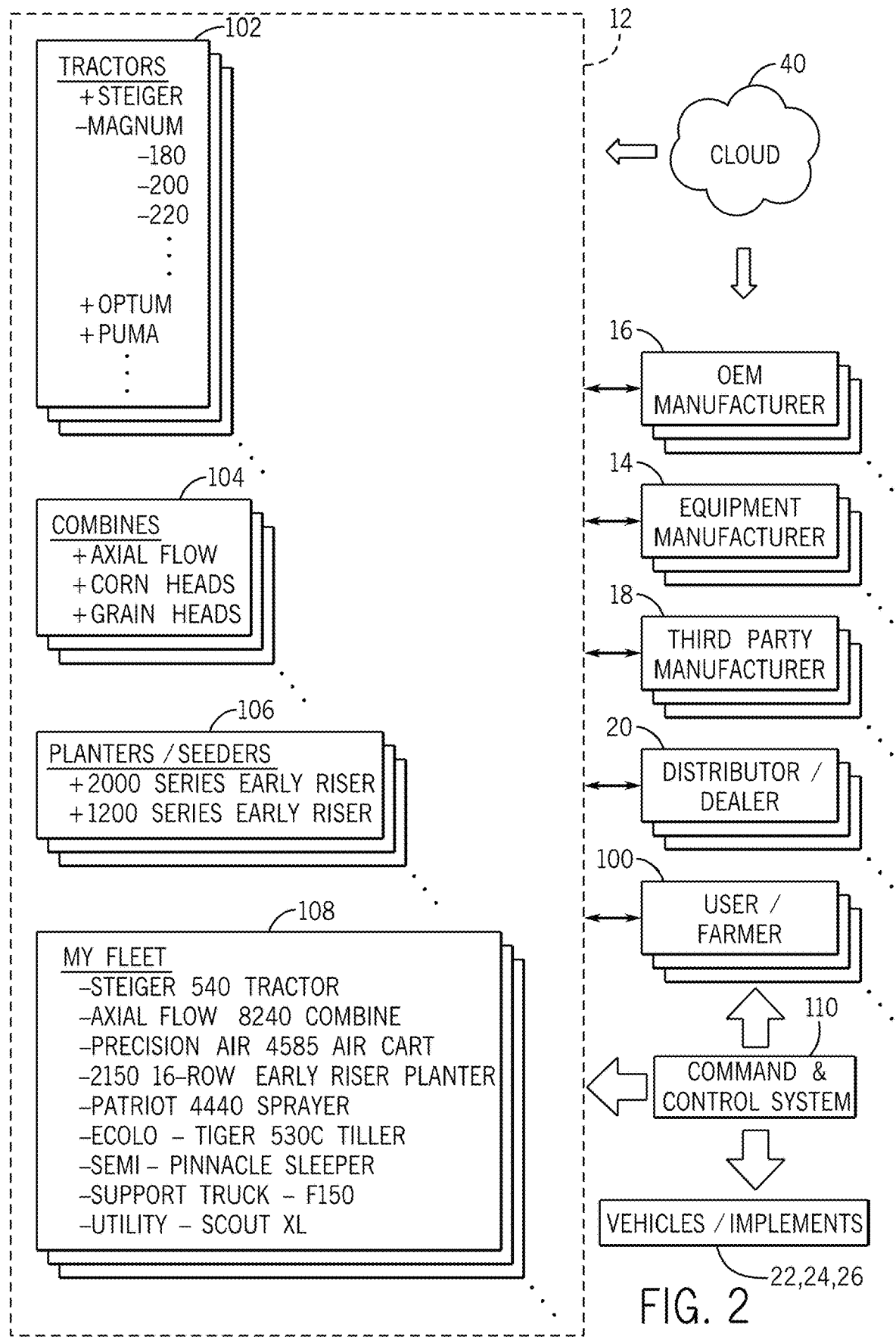
FIG. 2 is a schematic of the one or more libraries that may be available to the equipment operator 100, in accordance with an embodiment.

FIG. 2 is a schematic of the one or more libraries 12 that may be available to the equipment operator 100 (e.g., user, farmer, equipment owner, etc.). It should be understood that the organizational structure of the libraries 12 are merely exemplary and for illustrative purposes. Accordingly, embodiments of the libraries 12 with different organizational structures are possible. In some embodiments, the organizational structure of the library may be customizable. The libraries 12 illustrated in FIG. 2 include tractor libraries 102, combine libraries 104, planter/seeder libraries 106, and "my fleet" libraries 108. Though not shown, it should be understood that libraries for other types of agricultural equipment (e.g., tillers, other pieces of harvesting equipment, support vehicles, etc.) are envisaged. Each library may include a series of drop-down or nested options for a user to select. The various equipment libraries 102, 104, 106 may be organized by manufacturer, type of equipment, intended task, agricultural product, capability (horsepower, throughput, speed, etc.), model, trim level, compatibility with other pieces of equipment, etc. As discussed with regard to FIG. 1, the various manufacturers 14, 16, or third parties 18 may upload equipment information or equipment configuration code files to the libraries 12 available to users 100. The various manufacturers 14, 16, or third parties 18 may occasionally replace or update equipment configuration code files. In some embodiments, the equipment configuration code files may be a simple template that the user 100 may add to or alter, or that a dealer 20 may assist in customizing to control or configure one or more pieces of equipment in an actual work environment. The various manufacturers 14, 16, or third parties 18 may maintain and/or control access to the libraries 12. In other embodiments, the equipment configuration code files in the libraries 12, may be complete and ready to use once downloaded via the command and control software.

In some embodiments, the libraries 12 available to a user 100 may include one or more "my fleet" libraries 108, in which a user may store configuration code files, standard or customized, for the pieces of equipment to which the user has access or owns. The "my fleet" libraries 108 may be private libraries (e.g., only visible to the user 100), or publicly visible libraries. For example, a user 100 may add one or more equipment configuration code files from the various manufacturer libraries 102, 104, 106 to his or her "my fleet" library 108. The user may use the equipment configuration code files as they are, or may alter them for how he or she intends to use the equipment in an actual work environment. The user may intend to keep the equipment configuration code files in his "my fleet" 108 private such that other users 100 cannot see his equipment configuration code files, or the user may alter one or more equipment configuration code files and upload them to a public library 12 for other users 100 to access. A user 100 may have multiple "my fleet" libraries 108. For example, if a user 100 is a large entity with multiple locations or a large number of pieces of equipment, the user 100 may find it easier to manage the equipment configuration code files for their equipment using multiple "my fleet" libraries 108. In such a case, the libraries 108 may be organized by agricultural location, equipment manufacturer, equipment type, or a combination thereof.

As discussed with regard to FIG. 1, and described below in more detail with regard to FIG. 3, a user 100 may manage "my fleet" libraries via the equipment itself, a docking station in a barn (or other structure in which the equipment is stored), his home, or via a mobile device or a computer. The user may manage his or her libraries using command and control system software, a mobile application, or some other way. Over time, a manufacturer 16, 14, 18 may update the equipment configuration code files to reflect software updates, bug fixes, new features, and the like. In some embodiments, the equipment configuration code files for the one or more pieces of equipment in the user's "my fleet" library 108 may be automatically updated. In other embodiments, the user 100 may receive a notification that equipment information or a configuration code file have been updated and are ready for download. The user 100 may then update their equipment configuration code files, or not, at a convenient time.

As shown, the command and control system 110 may be in communication with the libraries 12, such that equipment configuration code files may be automatically or manually copied to the command and control system 110 for set up, route planning, control, and coordination of multiple vehicles 22, implements 24, or combinations 26. In some embodiments, the equipment configuration code files, or other setup/control files may be pushed to the vehicles 22, implements 24, or combinations 26.

Figure 3:
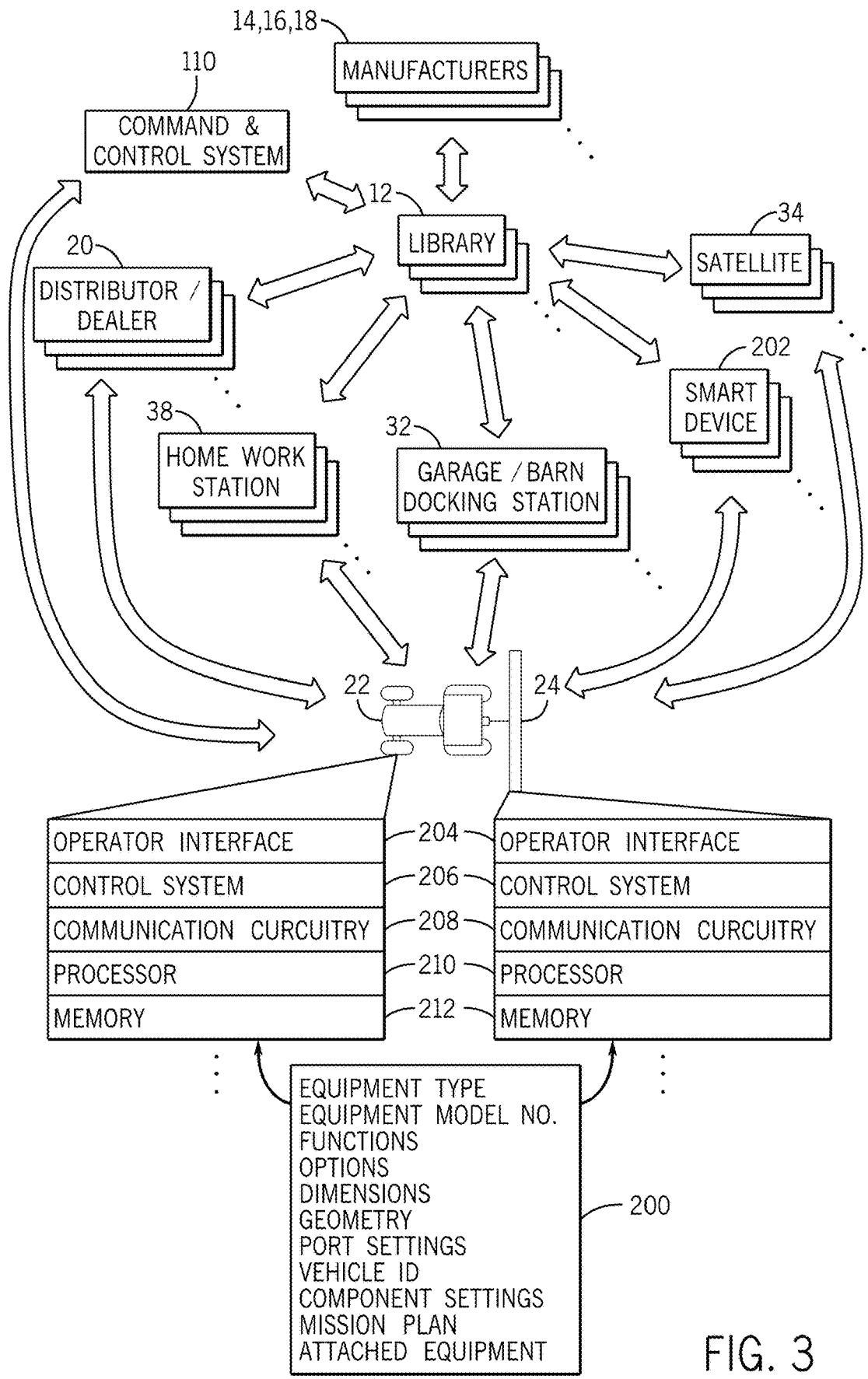
FIG. 3 is a schematic of one embodiment of equipment configuration code files installed on a vehicle and an implement.

FIG. 3 is a schematic of equipment configuration code files 200 installed on a vehicle 22 and an implement 24 via the command and control system software. As previously discussed, equipment manufacturers 14, OEMs 16, and third parties 18 may provide equipment information from their databases, or create equipment configuration code files 200 and add (e.g., upload) them to the one or more libraries 12. The equipment manufacturers 14, OEMs 16, and third parties 18 may also edit existing equipment configuration code files 200, or upload altered equipment configuration code files 200 to the one or more libraries 12. A dealer/distributor 20 may also download equipment configuration code files 200 or create equipment configuration code files 200 using the equipment information provided, and install equipment configuration code files 200 on one or more pieces of equipment 22, 24 via command and control software. In some embodiments, the dealer distributor 20 may also assist the user 100 in customizing one or more equipment configuration code files 200. In some instances, the dealer distributor 20 may upload new or modified equipment configuration code files 200 to the library 12, which may be accessible by the command and control system 110.

Similarly, a user 100 can download equipment configuration code files 200 from the library 12 and load them via the docking station 32, the home work station 38, a smart device 202, or a computer using the command and control software. The user 100 may also use the docking station 32, the home work station 38, the smart device 202, or the computer running command and control software to modify equipment configuration code files 200 and/or upload equipment configuration code files 200 to the one or more libraries 12.

In some embodiments, the various pieces of equipment 22, 24 may be capable of downloading and uploading equipment configuration code files 200 directly via a satellite 34. When the pieces of equipment 22, 24 communicate with the home work station 38, the docking station 32, the smart device 202, or computer wirelessly, the communication may involve one or more satellites 34.

Each piece of equipment 22, 24 may include a number of components and/or systems that enable the piece of equipment 22, 24 to perform agricultural tasks. For example, in the embodiment illustrated in FIG. 3, the tractor 22 and the implement 24 may each include an operator interface 204, a control system 206, communication circuitry 208, a processor 210, and a memory component 212. The user 100 may interact with the command and control software via the operator interface 204. The command and control software may be in communication with the command and control system 110, which may provide instructions (e.g., mission paths, minimum turning radius, action points, etc.) to the control system 206. It should be understood, however, that the components and/or systems shown in FIG. 3 are merely exemplary and that a piece of equipment 22, 24 may have additional components and/or systems, fewer components and/or systems, or various other combinations of components and/or systems.

The operator interface 204 may receive inputs from the operator 100 and/or display information for the operator 100. The control system may control one or more actuators or other systems within the piece of equipment 22, 24 based inputs from the operator, outputs from one or more sensors within the piece of equipment 22, 24, the equipment configuration code file 200, and the like. The communication circuitry 208 may facilitate communication between the various components and systems within the piece of equipment 22, 24. The communication circuitry 208 may also facilitate communication between the piece of equipment 22, 24, and external components (e.g., command and control system 110, a docking station 32, a home work station 38, a smart device 202, a computer, or a satellite via a wired or wireless connection). For example, the communication circuitry 208 may facilitate sending and/or receiving equipment configuration code files 200. The processor 210 may run software, programs, algorithms, etc. The memory component 212 may store software, programs, algorithms, equipment configuration code files 200, user inputs, collected data, etc. The specific features of these components and/or systems are discussed in more detail below with regard to FIG. 4.

Figure 4:
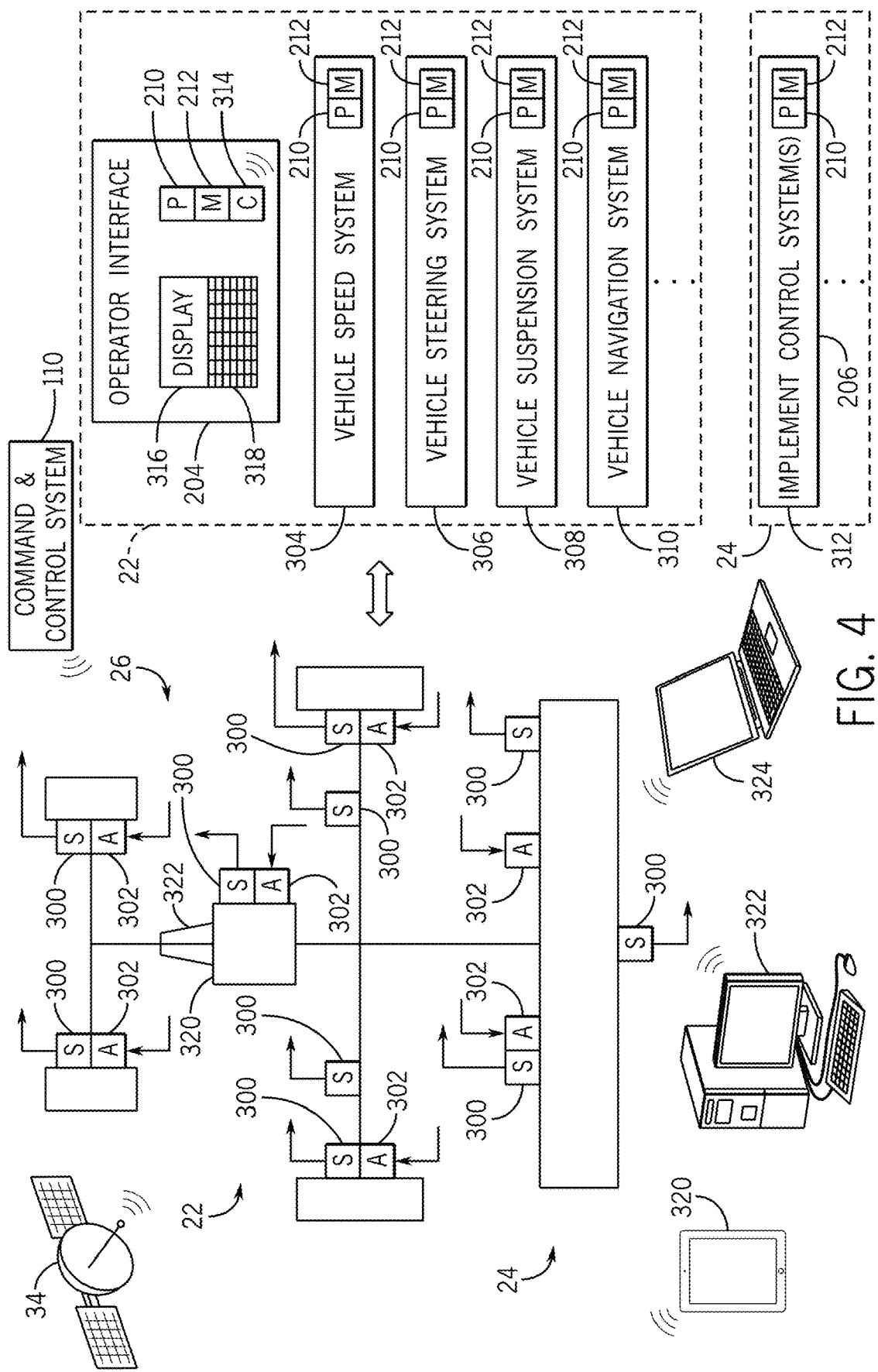
FIG. 4 is a schematic of one embodiment of an agricultural system that includes a vehicle coupled to an add-on piece of equipment.

The equipment configuration code file 200 for a piece of equipment 22, 24 may include information about the piece of equipment 22, 24. For example, as shown in FIG. 4, the equipment configuration code files 200 may include information regarding the equipment type, the equipment manufacturer, the equipment model number, equipment serial number, possible functions, options of the piece of equipment 22, 24, dimensions of the piece of equipment 22, 24, geometry, wheel base, track width, minimum turning radius, installed sensors, port settings, vehicle ID, equipment component settings, missions plans, compatible equipment, attached equipment, etc. It should be understood, however, that this list is merely exemplary and not intended to be exhaustive. Accordingly, an equipment configuration code file may not include all of the listed information, or may include more information than shown in FIG. 3.

The equipment configuration code files may be specific to a piece of equipment (e.g., instantiation), a user, an agricultural task, a season, a location (e.g., farm), weather conditions, attached equipment, equipment combinations, or some combination thereof.

FIG. 4 is a schematic of an agricultural system 26 that includes a vehicle 22 (e.g., tractor) coupled to an add-on piece of equipment 24 (e.g., an implement). As shown, the system 26 may include a number of sensors 300 and actuators 302 distributed throughout the system 26. For example, the sensors 300 may be configured to collect information or sense parameters indicative of qualities related to an engine, a motor, a suspension system, a steering system, a navigation system, a clutch or transmission system, an implement engagement, an implement height, an implement pitch, an implement speed, implement position, and the like. Similarly, the actuators 302 may be configured to receive inputs and make adjustments related to the engine, the motor, the suspension system, the steering system, the navigation system, the clutch or the transmission system, the implement engagement, the implement speed, the implement position, the implement pitch, and the like.

The various sensors 300 and actuators 302 may be part of, or be in communication with, various systems of the vehicle 22 or implement 24. Such systems may include, among others, the operator interface 204, a vehicle speed system 304, a vehicle steering system 306, a vehicle suspension system 308, a vehicle navigation system 310, an implement control system, and the like. As shown, each of the systems 204, 304, 306, 308, 310 may include a processor 210 and a memory component 212. The processor 210 may include one or more general-purpose processors, one or more application specific integrated circuits, one or more field programmable gate arrays, or the like. The memory 212 may be any tangible, non-transitory, computer readable medium that is capable of storing instructions executable by the processor 210 and/or data that may be processed by the processor 210. The memory 212 may include volatile memory, such as random access memory, or non-volatile memory, such as hard disk drives, read-only memory, optical disks, flash memory, and the like.

The operator interface 204 may be disposed inside a cab of the vehicle 22, on the exterior of a piece of equipment 24, via an autonomous command and control interface, or as part of the docking station 32. In some embodiments, there may be multiple operator interfaces 204 for a given agricultural system. The operator interface 204 may be configured to display information for, and receive inputs from, the operator 100 via the command and control software. In the illustrated embodiment, the operator interface 204 includes a processor 210, a memory component 212, communication circuitry 314, a display 316, and operator inputs 318. The communication circuitry 314 may be configured to communicate with the various other systems 304, 306, 308, 310 (e.g., via the communication circuitry 314). In some embodiments, the communication circuitry 314 may communicate with various components in the system 26 wirelessly. In some embodiments, the operator interface 204 and one or more of the other systems 304, 306, 308, 310 may be disposed within the same housing, may share processors 210, and/or memory components 212. The operator interface 204 includes a display 316 configured to display information related to the agricultural system 26 to the operator. The display 316 may be a screen, an array of LEDs, a series of gauges, a combination thereof, or some other arrangement. The operator interface 204 also include an operator input 318 that enables the user to input information. The operator input 318 may be a keyboard, a series of buttons, a joystick, a mouse, a track pad, etc. In some embodiments, the display 316 and the operator input 318 may be a single component (e.g., a touchscreen).

The vehicle speed system 304 may control the speed of the agricultural vehicle 22. Control of the speed may be by control of a throttle, control of a clutch, brakes, a transmission, control of one or more other systems, or a combination thereof. In the illustrated embodiment, the vehicle speed system 304 may control an engine 320, a transmission 322, and/or a braking system. For example, the vehicle speed system 304 may be configured to vary the output of an engine 320 to control the speed of the vehicle 22. The vehicle speed system 304 may do so by varying a throttle setting of the engine 320, a fuel/air mixture of the engine 320, a timing of the engine 320, and/or other suitable engine parameters to control engine 320 output. In addition, vehicle speed system 304 may adjust gear selection within the transmission 322 to control the speed of the vehicle 22. For example, the vehicle speed system 304 may allow for manual or automatic changing of gears or a gear ratio via the transmission 322 as a way to control the speed of the vehicle 22. The transmission 322 may include a number of fixed gear ratios or a continuously variable gear ratio. Furthermore, the vehicle speed system 304 may adjust braking force, thereby controlling the speed of the vehicle 22. Other embodiments of the vehicle speed system 304 may include other and/or additional sub-systems to facilitate adjusting the speed of the vehicle 22. The vehicle speed system 304 may be controlled by the operator in a manual mode of operation. In an automatic or semi-automatic mode of operation, the vehicle speed system 304 may be controlled automatically or semi-automatically.

The vehicle steering system 306 may control the steering of the vehicle 22. In the illustrated embodiment, the vehicle steering system 306 may include a wheel angle control system, a differential braking system, a torque vectoring system, and the like. For example, the wheel angle control system may automatically rotate one or more wheels or tracks of the vehicle 22 (e.g., via mechanical, electric, or hydraulic actuators) to steer the vehicle 22 along a path. By way of example, the wheel angle control system may rotate front wheels/tracks, rear wheels/tracks, and/or intermediate wheels/tracks of the vehicle 22, either individually or in groups. In some embodiments, steering may be accomplished by varying the speed of wheels or tracks on either side of the vehicle. In some embodiments, the wheel angle control system may be hydraulically actuated rather than, or in addition to, mechanically actuated (e.g., via gears). A hydraulically actuated steering system 306 may enable the agricultural vehicle 22 to turn without corresponding movement of a steering wheel (or other steering input device) inside the cab of the vehicle 22 during an automatic or semi-automatic drive mode. The differential braking system may independently vary the braking force on each side of the vehicle 22 to direct the vehicle 22 along the path. Similarly, the torque vectoring system may differentially apply torque from the engine to wheels and/or tracks on each side of the vehicle 22, thereby directing the vehicle 22 along the path. It should be appreciated that alternative embodiments of the vehicle steering system 306 may include any of these systems, or additional systems, in any suitable combination. Further embodiments may include a vehicle steering system 306 having other and/or additional systems to facilitate directing the vehicle 22 along the path (e.g., an articulated steering system, etc.). The vehicle steering system 306 may be controlled by the operator 100 in a manual mode of operation. In an automatic or semi-automatic mode of operation, the vehicle steering system 306 may be controlled automatically. For example, in a semi-automatic mode of operation, the steering system 306 may be automatically controlled, and the speed system 304 may be controlled by the operator 100. In a fully automatic mode of operation, both the speed system 304 and the steering system 306 may be automatically controlled.

The vehicle suspension system 308 may control the ride height of the vehicle 22 and/or the firmness of the vehicle's 22 ride. The vehicle suspension system 308 may include an airbag suspension, springs and dampers, cylinders, or a combination thereof. The vehicle suspension system 308 may use different settings when the vehicle 22 is moving in a field versus on a road. Similarly, the vehicle suspension system 308 may have different settings when an implement 24 is attached to the vehicle 22. The vehicle suspension system 308 may be controlled by the user, or automatically. In some embodiments, the vehicle suspension system 308 may be controlled semi-automatically by allowing the operator to select a suspension mode (e.g., harsh ride, medium ride, soft ride, in field, on road, etc.).

The vehicle navigation system 310 may include a Global Navigation Satellite System (GNSS) receiver configured to communicate with two or more satellites 34 in orbit (e.g., GPS, GLONASS, Galileo, BeiDou, etc.) to determine the location, heading, speed, etc. of the vehicle 22. The receiver may include one or more processors 210, a memory component 212, input/output, a power supply, and radio circuitry. In some embodiments, the receiver may also include an internal measurement unit, which can be used for terrain compensation (e.g., compensating for receiver motion due to pitch and roll of the vehicle) and dead-reckoning (e.g., checking motion of GPS against inertial measurements to detect invalid GPS positions, such as GPS hops, etc. The processors 210 may run software stored on the memory component 212 to compute the position of the vehicle 22. Based on the computed position, the processor may also determine the vehicle 22 heading, speed, etc. The navigation system 310 may use the vehicle position, speed, heading, etc. to guide the vehicle to a given location or along a desired path.

The implement control system 312 may be used to control the implement 24. For example, the implement control system 312 may raise or lower the implement 24, turn the implement 24 on or off, adjust implement 24 pitch, or otherwise engage or disengage the implement 24, deploy ground-engaging tools of the implement 24, control the speed of the implement 24, etc., or a combination thereof.

The vehicle 22 may be capable of communicating with a mobile device (e.g., smart phones or tablets), a desktop computer 322, and/or a laptop computer 324 via a wired or wireless connection, directly or indirectly (e.g., via a satellite or wireless network).

Figure 5:
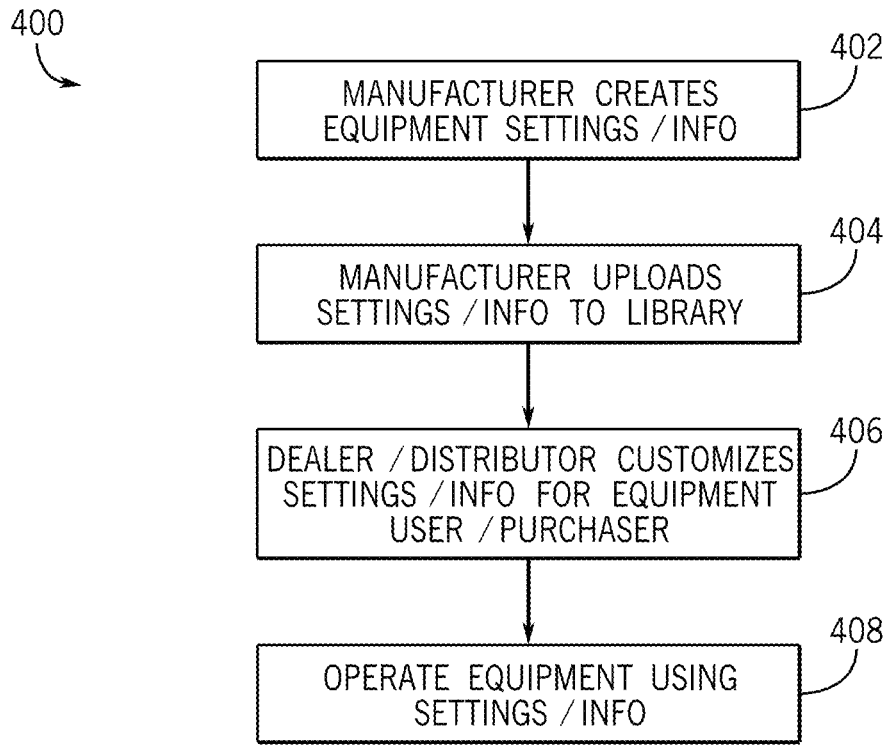
FIG. 5 is a flow chart of one embodiment of a process for populating a library of configuration code files, customizing the configuration code files, and operating equipment using one of the configuration code files.

FIG. 5 is a flow chart of a process 400 for populating a library of configuration code files 200 (e.g., on a volatile memory), customizing or altering the configuration code files 200, and controlling one or more pieces of equipment using one of the configuration code files 200 to perform an agricultural task. In block 402, a manufacturer or third party 14, 16, 18 aggregates equipment information from their databases or some other source. The equipment information may or may not be input into template files, partial configuration code files 200, or complete configuration code files 200.

In block 404, the equipment information or configuration code files 200 are uploaded and saved to one or more libraries 12. The libraries 12 may include public and/or private libraries. The uploaded equipment information or configuration code files 200 may automatically update and/or replace existing equipment information or configuration code files 200 in a library 12, or duplicate equipment information or configuration code files 200 may be created. In some embodiments, the user 100 may be notified (e.g., via notification in the command and control software, push notification, email, text message, etc.) that updated equipment information or configuration code files 200 are available for download. The user 100 may then download the new equipment information or configuration code files 200 whenever it is convenient.

In block 406, a dealer/distributor 20 may customize equipment configuration code files 200 for one or more pieces of equipment 22, 24 purchased by the user. In some embodiments, the altered equipment configuration code files 200 may be available to the user via a library 12. In other embodiments, the dealer/distributor 20 may load the equipment configuration code files 200 on the equipment 22, 24. It should be understood, however, that a user may customize his or her own equipment configuration code files 200. In such a case, the dealer/distributor 20 may not alter the equipment configuration code files 200 and block 406 may be omitted. Similarly, the user 100 may load and select equipment configuration code files 200 as needed as he or she transitions between agricultural tasks. In block 408 the equipment 22, 24 is used to perform an agricultural task and controlled based on the selected equipment configuration code files 200 (e.g., via the command and control system 110).

Figure 6:
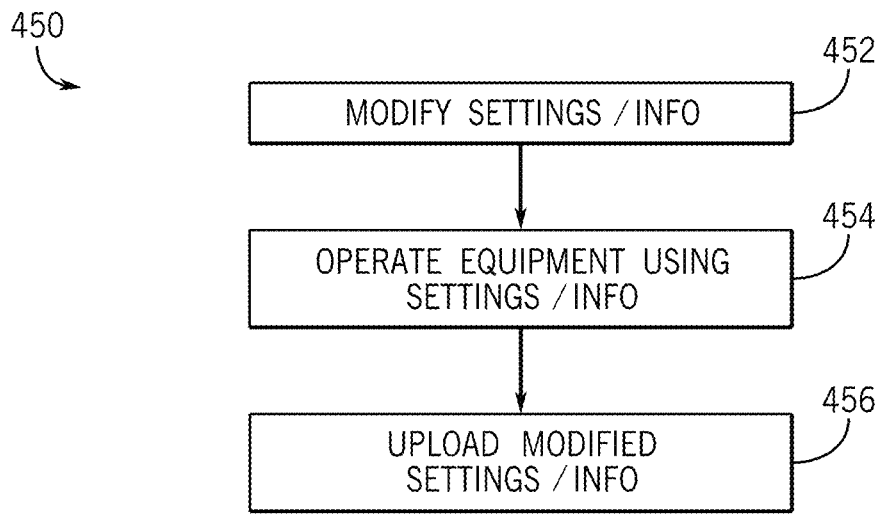
FIG. 6 is a flow chart of one embodiment of a process for modifying equipment configuration code files.

FIG. 6 is a flow chart of a process 450 for altering equipment configuration code files 200. As a user 100 uses one or more pieces of equipment 22, 24, the user may desire to make adjustments to the equipment setting or configuration code files 200. In block 452 the user may adjust the settings directly in the vehicle 22, during actual use of the equipment, via the docking station 32, a remote workstation 38, a mobile device 320 or computer 322, 324. In block 454, the user may operate equipment using the new settings to confirm the new settings. Once the user is happy with the settings adjustments, the user 100 may update an existing equipment configuration code file 200 or create a new equipment configuration code file 200, which may then be uploaded to one of the user's public or private libraries 12. In some embodiments, the user may not wish to experiment with the new settings before creating an equipment configuration code file 200.

Figure 7:
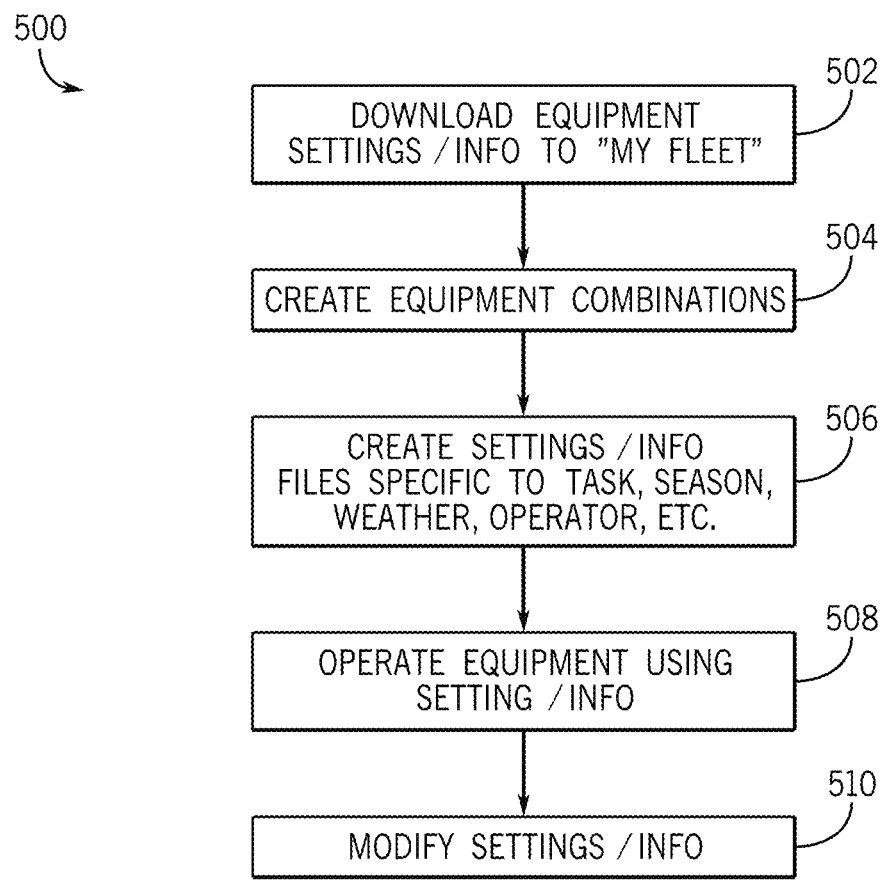
FIG. 7 is a flow chart of one embodiment of a process for downloading, customizing, and using equipment configuration code files via the "my fleet" feature in accordance with an embodiment.

FIG. 7 is a flow chart of a process for downloading, customizing, and using equipment configuration code files 200 via the "my fleet" feature. In block 502, the user 100 selects one or more equipment configuration code files 200 from a public library 12 and copies them to a "my fleet" library 108 for download.

In block 504, once the user 100 has downloaded multiple equipment configuration code files 200, the user may combine equipment configuration code files 200 or add to existing equipment configuration code files 200 to create equipment combinations 26 (e.g., tractor 22 plus one or more attachments and/or implements 24). For example, the user may create one equipment configuration code file 200 for a tractor 22 and tilling implement 24 combination, and another for a tractor 22, seeder 24, and aircart combination. However, if the user 100 does not wish to create combination equipment configuration code files 200, block 504 may be omitted.

In block 506, the user 100 may customize or alter equipment configuration code files 200 for specific tasks, seasons, weather conditions, operators, etc. For example, the user 100 may download a basic equipment configuration code file 200 from a manufacturer's 20 library. If the user 100 wants to alter one or more equipment configuration code files 200 for various conditions, the user may. For example, for a given tractor 22, the user may have separate equipment configuration code files 200 for tilling, seeding, and harvesting, each configured to work with a corresponding implement 24. In another example, two different equipment operators may create their own equipment configuration code file 200 for the same tractor because they prefer to use different settings when operating the tractor 22. Similarly, a farmer may have separate spring, summer, and autumn equipment configuration code files 200 for a tractor. It should be understood that the preceding examples are merely examples and not intended to be limiting.

In block 508, the user 100 may operate the one or more pieces of equipment 22, 24, based on the customized equipment configuration code files 200 (e.g., via the command and control system 110) to confirm the setting adjustments. As previously discussed, in some cases use of the equipment to confirm settings adjustments may be omitted. In block 510 the user makes modifications to the settings necessary based on the test use. In some embodiments, additional adjustments and testing may or may not occur. The user may then save the equipment configuration code file 200 to "my fleet," or upload the equipment configuration code file 200 to a library 12.

Figure 8:
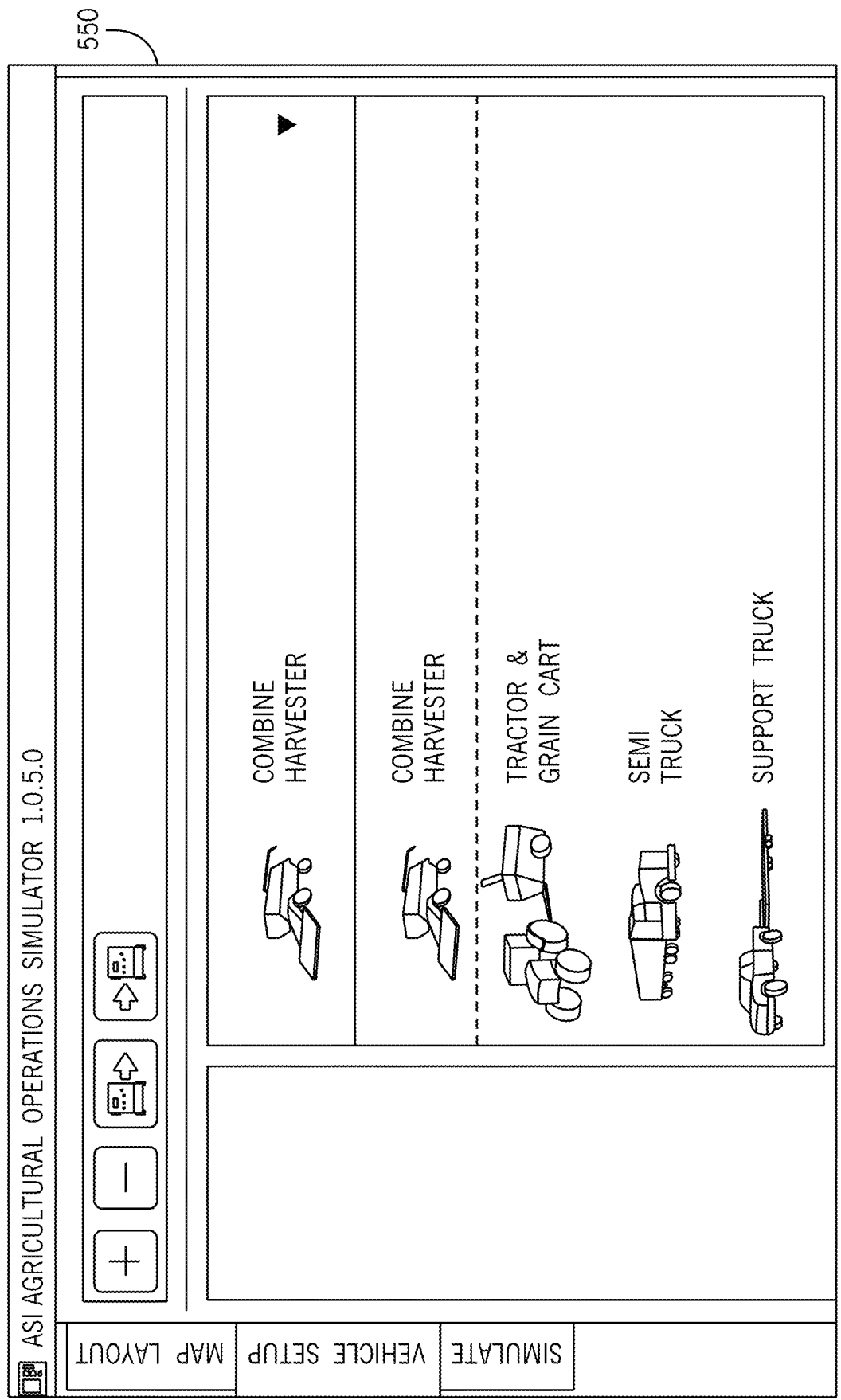
FIG. 8 is a screenshot from one embodiment of the command and control software showing a drop-down menu allowing the user to select a vehicle for setup.
Figure 9:
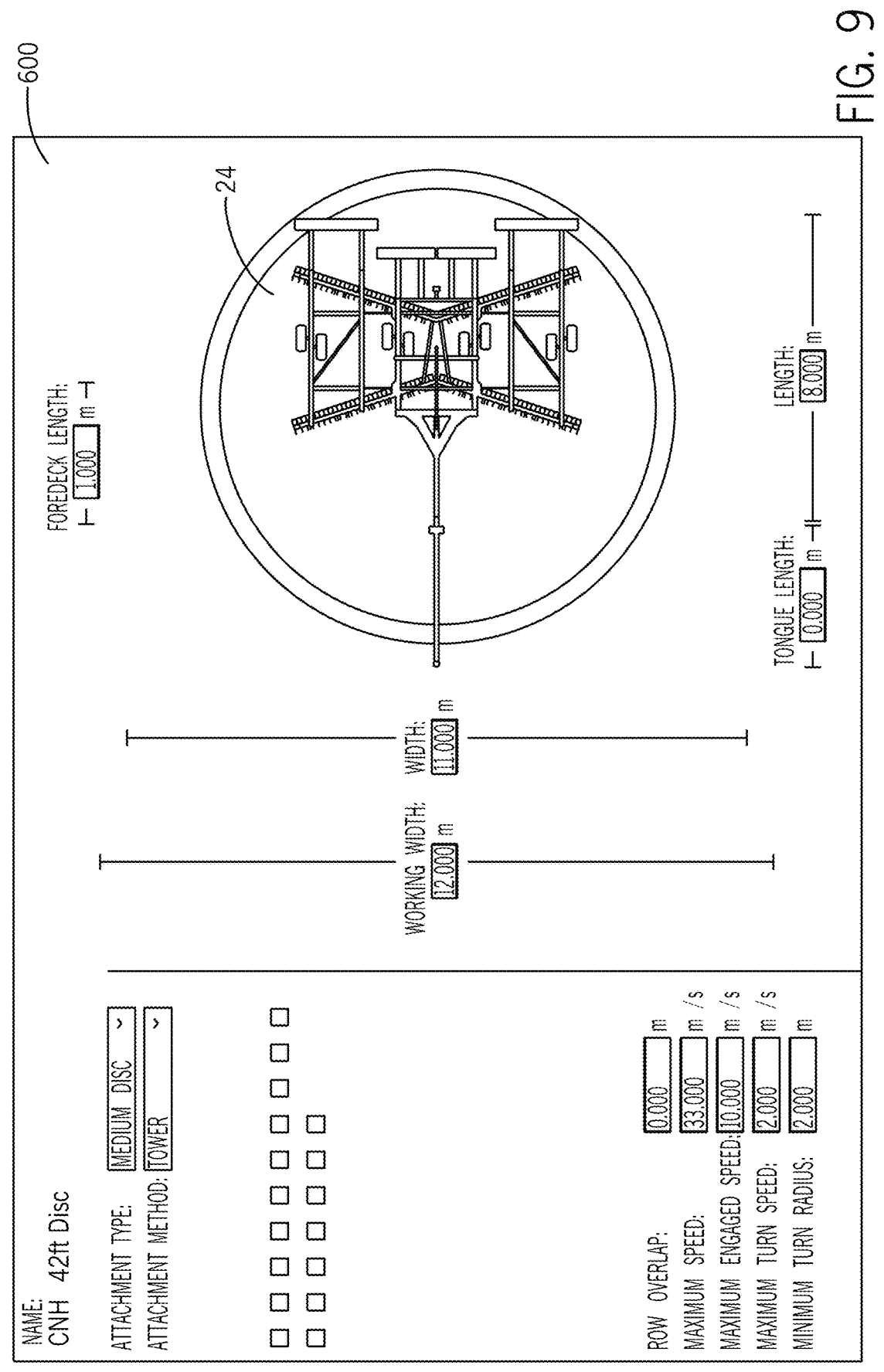
Figure 10:
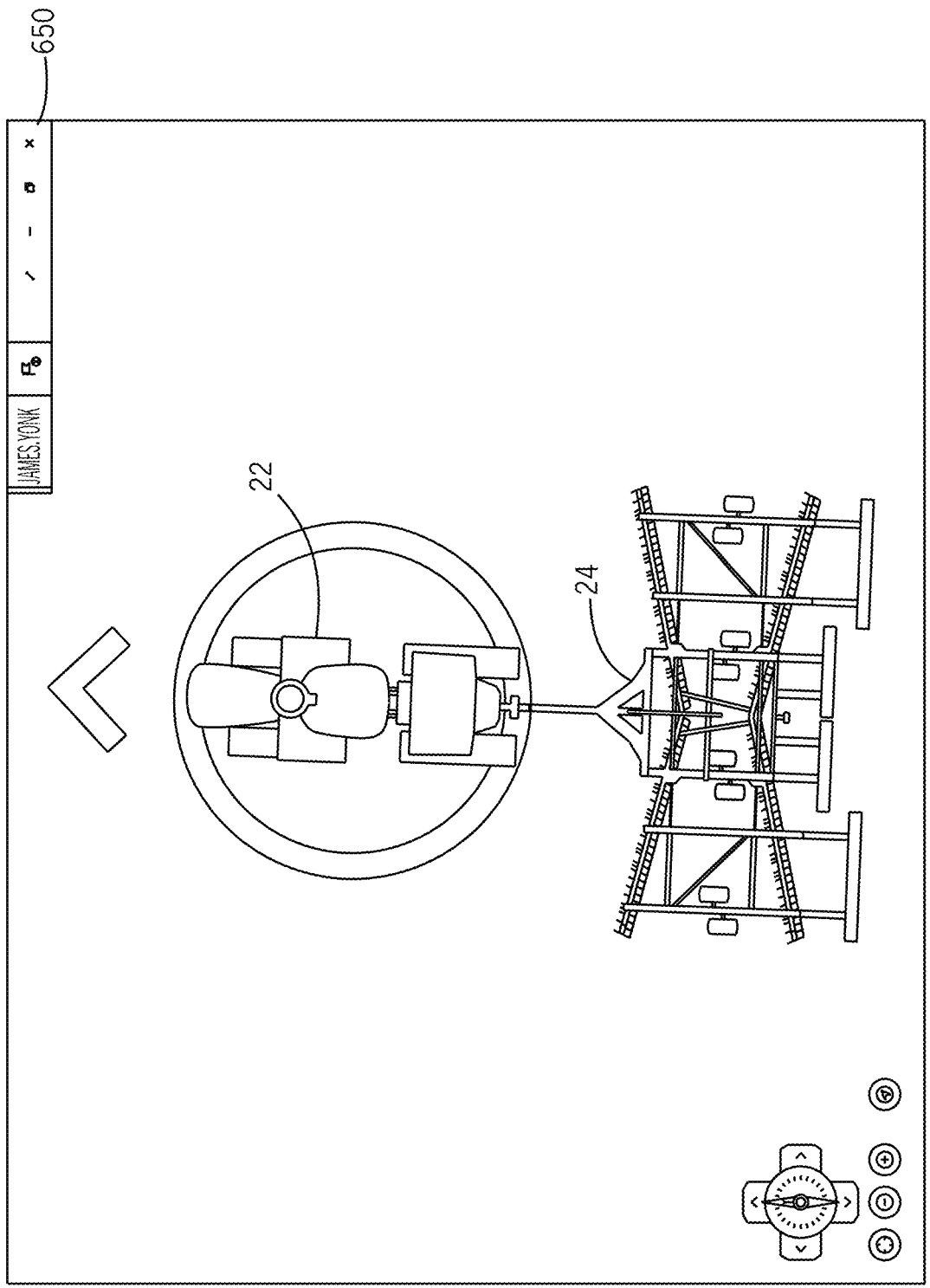
FIG. 10 is a screenshot from one embodiment of the command and control software showing a vehicle towing an implement.

FIGS. 8-10 are sample screenshots from command and control software. The command and control software may be available to the user via the operator interface 204 of the vehicle 22, the operator interface 204 of the docking station 32, a remote workstation 38, a mobile device 320, or computer 322, 324. FIG. 8 is a screenshot 550 from the command and control software showing a drop-down menu allowing the user 100 to select a vehicle 22 for setup. In the illustrated embodiment, the user 100 may select from a combine harvester, a tractor and grain cart, a semi-truck, and a support truck. Once a vehicle is selected, the user may proceed to customize various features and settings.

FIG. 9 is a screenshot 600 from the command and control software showing information (which may be part of the equipment configuration code file 200) for a towed implement 24. For example, the displayed information includes the attachment type, the attachment method, row overlap, maximum speed, maximum engaged speed, maximum turn speed, minimum turn radius, working width, width, tongue length, length, and foredeck length. It should be understood, however, that the screenshot 600 of FIG. 9 is merely an example and that the displayed information may vary.

FIG. 10 is a screenshot 650 from the command and control software showing a vehicle 22 towing an implement 24. The screenshot 650 may be similar to what is seen by the operator 100 (e.g., via the operator interface 204) as they perform an agricultural task. Alternatively, the screenshot 650 may be what the user 100 sees as they set up the vehicle 22 and implement 24 in the command and control circuitry.

The disclosed techniques include creating and maintaining equipment configuration code files for pieces of agricultural equipment, allowing a user to quickly transition from one piece of equipment, or one combination of pieces of equipment, to the next with minimal setup time. By reducing the transition time between tasks, efficiency of an agricultural application may be improved.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
a work vehicle; and
an operator interface, comprising:
  a processor;
  a display communicatively coupled to the processor;
  communication circuitry communicatively coupled to the processor; and
  a memory, accessible by the processor and storing instructions that, when executed by the processor, cause the processor to perform operations comprising:
    rendering, via the display, a graphical user interface (GUI) that displays a library comprising representations of a plurality of equipment configuration code files, wherein each equipment configuration code file comprises configuration code defining a plurality of equipment settings for configuration and control of the work vehicle, for configuration and control of an attachment to be carried or towed by the work vehicle, or for combined configuration and control of both the work vehicle and the attachment in combination;
    receiving, via the GUI, a selection of a particular representation of a particular equipment configuration code file from the plurality of equipment configuration code files in the library;
    transmitting, to a remote server, via the communication circuitry, a request for the particular equipment configuration code file selected via the GUI;

receiving, from the remote server, via the communication circuitry, the particular equipment configuration code file selected via the GUI;

storing the particular equipment configuration code file in the memory; and controlling the work vehicle based on the particular equipment configuration code file.

2. The system of claim 1, wherein the operations comprise:

receiving, via the GUI, an input indicative of a modification to the particular equipment configuration code file; and updating, via the processor, the particular equipment configuration code file stored in memory based on the modification.

3. The system of claim 2, wherein the modification to the particular equipment configuration code file is to adapt configuration and control of the work vehicle, the attachment, or both, for a specific user, a vehicle-attachment combination, a season, an agricultural task, a geographic location, or a combination thereof.

4. The system of claim 2, wherein the operations comprise transmitting, via the communication circuitry, the updated particular equipment configuration code file to the remote server.

5. The system of claim 1, comprising the attachment, wherein the configuration code of the particular equipment configuration code file is for configuration and control of both the work vehicle and the attachment in combination.

6. The system of claim 1, wherein the library is maintained by a dealer of the work vehicle, a distributor of the work vehicle, or an original equipment manufacturer of the work vehicle.

7. The system of claim 1, wherein the library is maintained by a third party that is not a dealer of the work vehicle, a distributor of the work vehicle, an original equipment manufacturer of the work vehicle, or a user of the work vehicle.

8. The system of claim 1, wherein the operator interface comprises a mobile device.

9. The system of claim 1, wherein the operator interface is a component of the work vehicle.

10. A system, comprising:

a processor; and a memory, accessible by the processor and storing instructions that, when executed by the processor, cause the processor to perform operations comprising:

rendering, via the processor, a graphical user interface (GUI) that displays a library comprising representations of a plurality of equipment configuration code files, wherein each equipment configuration code file comprises configuration code defining a plurality of equipment settings for configuration and control of a work vehicle, for configuration and control of an attachment to be carried or towed by the work vehicle, or for combined configuration and control of both the work vehicle and the attachment in combination;

receiving, via the GUI, a selection of a particular representation of a particular equipment configuration code file of the plurality of equipment configuration code files;

transmitting, to a remote server, a request for the particular equipment configuration code file selected via the GUI;

receiving, from the remote server, the particular equipment configuration code file selected via the GUI;

storing the particular equipment configuration code file in the memory; and generating a command to adjust one or more settings of the work vehicle based on the particular equipment configuration code file.

11. The system of claim 10, wherein the operations comprise:

receiving, via the GUI, an input indicative of a modification to the particular equipment configuration code file; and updating, via the processor, the particular equipment configuration code file stored in memory based on the modification.

12. The system of claim 11, wherein the modification to the particular equipment configuration code file is to adapt configuration and control of the work vehicle, the attachment, or both for a specific user, a vehicle-attachment combination, a season, an agricultural task, a geographic location, or a combination thereof.

13. The system of claim 11, wherein the operations comprise transmitting the updated particular equipment configuration code file to the remote server.

14. The system of claim 10, wherein the library is maintained by a dealer of the work vehicle, a distributor of the work vehicle, or an original equipment manufacturer of the work vehicle.

15. The system of claim 10, wherein the library is maintained by a third party that is not a dealer of the work vehicle, a distributor of the work vehicle, an original equipment manufacturer of the work vehicle, or a user of the work vehicle.

16. A method, comprising:

rendering, via a processor, a graphical user interface (GUI) that displays a library comprising representations of a plurality of equipment configuration code files, wherein each equipment configuration code file comprises configuration code defining a plurality of equipment settings for configuration and control of a work vehicle, for configuration and control of an attachment to be carried or towed by the work vehicle, or for combined configuration and control of both the work vehicle and the attachment in combination;

receiving, via the GUI, a selection of a particular representation of a particular equipment configuration code file of the plurality of equipment configuration code files;

transmitting, to a remote server, a request for the particular equipment configuration code file selected via the GUI;

receiving, from the remote server, the particular equipment configuration code file selected via the GUI; and generating, via the processor, a command to adjust one or more settings of the work vehicle based on the particular equipment configuration code file.

17. The method of claim 16, comprising:

receiving, via the GUI, an input indicative of a modification to the particular equipment configuration code file; and updating, via the processor, the particular equipment configuration code file stored in memory based on the modification.

18. The method of claim 17, wherein the modification to the particular equipment configuration code file is to adapt configuration and control of the work vehicle, the attachment, or both for a specific user, a vehicle-attachment combination, a season, an agricultural task, a geographic location, or a combination thereof.

19. The method of claim 17, comprising transmitting the updated particular equipment configuration code file to the remote server.

20. The method of claim 16, wherein the library is maintained by a dealer of the work vehicle, a distributor of the work vehicle, or an original equipment manufacturer of the work vehicle.

\* \* \* \* \*